V. S. PERAZIO.
PIPE COUPLING.
APPLICATION FILED JAN. 20, 1910.
964,310.
Patented July 12, 1910.
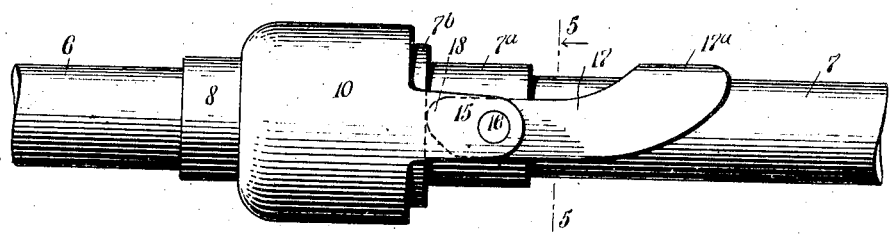
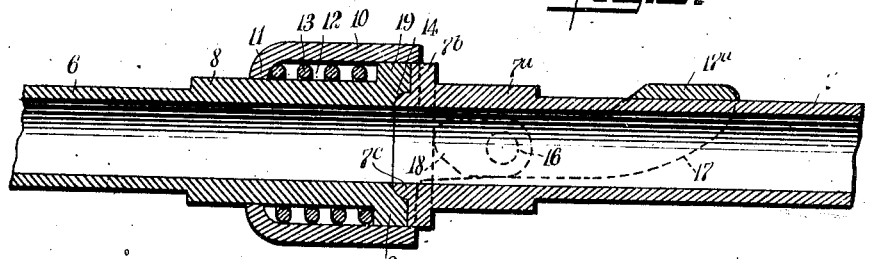
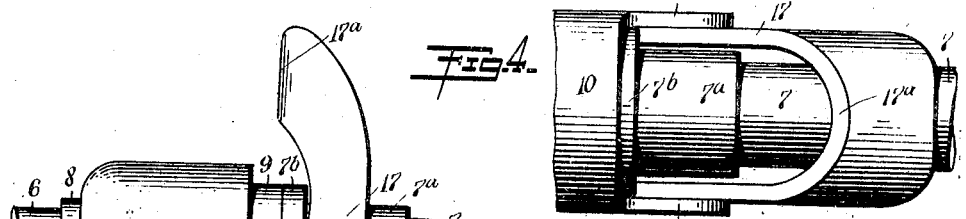
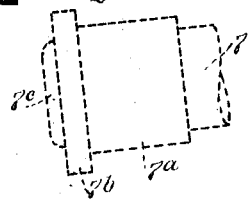
WITNESSES:
G. Robert Thomas
Walton Harrison
INVENTOR
Valentine S. Perazio
BY Munn & Co
ATTORNEYS

UNITED STATES PATENT OFFICE.

VALENTINE S. PERAZIO, OF NEW YORK, N. Y.

PIPE-COUPLING.

964,310.    Specification of Letters Patent.    Patented July 12, 1910.

Application filed January 20, 1910. Serial No. 538,965.

*To all whom it may concern:*

Be it known that I, VALENTINE S. PERAZIO, a subject of the King of Italy, and a resident of the city of New York, borough of Manhattan, in the county and State of New York, have invented a new and Improved Pipe-Coupling, of which the following is a full, clear, and exact description.

My invention relates to pipe couplings admitting of general use, and more particularly to pipe couplings of a kind carried by vehicles for the purpose of conveying liquid hydrocarbon fuel from one part of the vehicle to another.

More specifically stated, my invention comprehends a pair of pipe sections fitted accurately together, so as to prevent leakage when secured together, and improved clamping mechanism, simple in design and efficient in action, connected with the ends for securing them together and releasing them at will, this operation being performed instantly and without the need of wrenches, thus lessening the risk of twisting off the ends of the pipe section, as well as saving time and room.

Reference is to be had to the accompanying drawings forming a part of this specification, in which similar characters of reference indicate corresponding parts in all the figures.

Figure 1 is a side elevation showing my improved pipe coupling complete, the ends of the pipe being connected; Fig. 2 is a longitudinal central vertical section through the same; Fig. 3 is a side elevation of the same parts appearing in Figs. 1 and 2, but showing the clamping lever as moved for the purpose of uncoupling; the lower part of this figure also showing in dotted lines the appearance of the pipe sections when disconnected; Fig. 4 is a plan view of the mechanism shown in Fig. 1; and Fig. 5 is a section on the line 5—5 of Fig. 1, looking in the direction of the arrow.

At 6, 7 are two separate pipe sections, the pipe section 7 being provided with an enlarged portion $7^a$, and the pipe section 6 being similarly provided with a portion 8, of increased diameter. The pipe section 6 is further provided with a disk-like head 9, integral with the enlarged portion 8. A sleeve 10, encircles the disk-like head 9 and extends some little distance along the enlarged portion 8. The sleeve 10 is provided with a throat 11, which fits neatly around the enlarged portion 8.

At 12, is a void or space having a general annular form and of variable length, depending upon the position of the sleeve 10 relatively to the enlarged portion 8. A spiral spring 13, is mounted within the sleeve 10 and bears against the throat 11 on the one hand and against the disk-shaped head 9 on the other. The pressure of the spring 13 tends normally to force the sleeve 10 to the left according to Fig. 2.

The head 9 is provided with a seat 14, of a general concave form. The sleeve 10 is provided with ears 15, and mounted within the latter are pivot pins 16, a cam lever 17, being mounted upon these pivot pins and adapted to turn or rock within reasonable limits. The cam lever 17 has generally a U-shape, being provided with a curved portion $17^a$, which is adapted to fit neatly against the adjacent side of the pipe section 7. The cam lever, because of its shape, can thus lie in very close proximity to the pipe section 7, being thus very compact and for some purposes practically concealed. The cam lever 17 is provided with two lobes 18, serving the purpose of cams. The pipe section 7 is provided with a disk-like head $7^b$, integral with the enlarged portion $7^a$ and provided with a convex surface $7^c$, mating the concave seat 14 and adapted to fit the same accurately, so as to form a tight joint.

The operation of my device is as follows: So long as the two pipe sections remain disconnected, the tension of the spring 13, by pressing the sleeve 10 to the left, according to Fig. 2, causes a portion of the head 9 to be exposed, as will be understood from Fig. 3. Suppose, now, that it be desired to couple up the pipe sections. The convex portion $7^c$ of the pipe section 7 is fitted neatly into the seat 14, the outer portion of the head $7^b$ being thus brought into engagement with the outer portion of the head 9. While this takes place, the cam lever 17 is raised—that is, occupies the position indicated in Fig. 3. The cam lever is now grasped by the operator and lowered—that is, pressed into the positions indicated in Figs. 1, 2 and 4, so that the portion $7^a$ of the cam lever lodges against and partially encircles the pipe section 7. By this movement of the cam lever, the lobes 18 press the head $7^b$ to the left according to the figures just mentioned and against the head 9, the convex portion 7ᶜ being thus caused to bind hard against its seat 14. This causes the head 9 and portion 8 of the pipe section 6 to move to the left, according to Fig. 2—or, what amounts to the same thing, causes the sleeve 10 to be drawn to the right so as to partially overlap the joint between the heads 7ᵇ and 9. The sealing of this joint is thus perfected in case the convex portion 7ᶜ, in binding against its seat 14, fails to make a perfectly tight joint. In order to uncouple, the operator grasps the cam lever 17 and raises it into the position indicated in Fig. 3. The pipe section 7 is now moved axially in relation to the pipe section 6—that is, the head 7ᵇ is slipped laterally off the head 9 and the pipe sections are thus uncoupled.

While I show all parts of each pipe section as integral therewith, I do not limit myself to this exact form for the pipe sections or either of them.

Having thus described my invention, I claim as new and desire to secure by Letters Patent:

1. In a pipe coupling, the combination of a pipe section provided with a head having a concave seat, a second pipe section provided with a head having a convex portion for fitting against said seat, a sleeve mounted upon one of said pipe sections and movable relatively to the same, said sleeve being movable for the purpose of enabling it to cover the joint between said heads, a spring for normally retracting said sleeve so as to uncover said joint, and cam mechanism for forcing said sleeve against said spring, thereby compressing the same and moving said sleeve over said joint.

2. In a pipe coupling the combination of a pipe section provided with a head, a second pipe section provided with a head, a sleeve mounted on one of said pipe sections and movable relatively to the same for the purpose of enabling it to cover the joint between said heads, a spring for normally retracting said sleeve so as to uncover the joint, and a cam mechanism for forcing said sleeve against said frame, thereby compressing the latter and moving said sleeve over said joint.

In testimony whereof I have signed my name to this specification in the presence of two subscribing witnesses.

VALENTINE S. PERAZIO.

Witnesses:
 WALTON HARRISON,
 PHILIP D. ROLLHAUS.